(12) United States Patent
Aker (10) Patent No.: US 10,748,047 B2
(45) Date of Patent: Aug. 18, 2020

(54) METHODS AND PRODUCTS FOR DISPLAYING ENCODED INFORMATION AND SYSTEMS ASSOCIATED THEREWITH

(71) Applicant: Zebra Technologies Corporation, Lincolnshire, IL (US)

(72) Inventor: Wynn L. Aker, Manorville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 52 days.

(21) Appl. No.: 16/221,718

(22) Filed: Dec. 17, 2018

(65) Prior Publication Data

US 2020/0193253 A1 Jun. 18, 2020

(51) Int. Cl.
*G06K 19/06* (2006.01)
*G06K 7/14* (2006.01)

(52) U.S. Cl.
CPC ..... *G06K 19/06093* (2013.01); *G06K 7/1443* (2013.01); *G06K 7/1456* (2013.01); *G06K 19/06037* (2013.01); *G06K 19/06103* (2013.01)

(58) Field of Classification Search
CPC ........... G06K 19/06093; G06K 7/1443; G06K 7/1447; G06K 7/1456; G06K 7/10861; G06Q 10/08; G06Q 10/087
See application file for complete search history.

(56) References Cited

U.S. PATENT DOCUMENTS

2007/0119939 A1\* 5/2007 Epshteyn ........... G06K 7/10871
235/462.08
2011/0215146 A1\* 9/2011 Shams .................... G06F 17/00
235/383

\* cited by examiner

*Primary Examiner* — Suezu Ellis
(74) *Attorney, Agent, or Firm* — Yuri Astvatsaturov (57) ABSTRACT

At least some embodiments of the present invention relate to approaches for displaying encoded information and systems used to capture said information. In an embodiment, the present invention is a method that includes: providing a product packaging having a first face; providing a first symbology on the first face; providing a second symbology on the first face; and providing a third symbology on the first face, wherein the second symbology is the first symbology distorted in accordance with a first distortion function, the first distortion function distorting at least one of an aspect ratio and a skew pursuant to a first parameter; and wherein the third symbology is the first symbology distorted in accordance with a second distortion function, the second distortion function distorting at least one of the aspect ratio and the skew pursuant to a second parameter, the second parameter being different from the first parameter.

21 Claims, 7 Drawing Sheets

METHODS AND PRODUCTS FOR DISPLAYING ENCODED INFORMATION AND SYSTEMS ASSOCIATED THEREWITH

FIELD OF INVENTION

At least some embodiments of the present invention relate to the field of symbologies (also referred to herein as "barcodes"), and more specifically, to symbologies provided on product packaging for identification and/or tracking thereof.

BACKGROUND

Barcodes have been widely used in retail settings to provide product-identifying information in machine readable form. Conventional uses of barcodes dictate that a barcode reader is typically positioned directly in front of and some distance away from the barcode, allowing it to capture image data associated therewith and decode the information encoded in the barcode by analyzing the contends of the image data. While this approach is employed across many different functions (e.g., a cashier at a checkout station in a retail venue, a warehouse employee conducting inventory control, delivery personnel capturing package data, etc.), newly emerging functions are driving a need for novel methods to provide and capture barcode data.

SUMMARY

In an embodiment, the present invention is a method of providing encoded data for product identification. The method includes: providing a product packaging having a first face; providing a first symbology on the first face; providing a second symbology on the first face; and providing a third symbology on the first face, wherein the second symbology is the first symbology distorted in accordance with a first distortion function, the first distortion function distorting at least one of an aspect ratio and a skew pursuant to a first parameter; and wherein the third symbology is the first symbology distorted in accordance with a second distortion function, the second distortion function distorting at least one of the aspect ratio and the skew pursuant to a second parameter, the second parameter being different from the first parameter.

In a variation of this embodiment, each of the first symbology, the second symbology, and the third symbology is configured to be read by an imaging symbology reader having a two-dimensional field of view (FOV) with a central FOV axis, the first symbology is configured to be read by the imaging symbology reader when the central FOV axis is substantially orthogonal to the first face, and each of the second symbology and the third symbology is configured to be read by the imaging symbology reader when the central FOV axis is substantially angled at 5-30 degrees relative to the first face.

In another embodiment, the present invention is a method of providing encoded data for product identification. The method includes: determining a first symbology associated with the encoded data, the first symbology being configured to be read by an imaging symbology reader having a two-dimensional field of view (FOV) with a central FOV axis when the imaging symbology reader is positioned such that the central FOV axis is substantially orthogonal to a surface displaying the first symbology; determining a second symbology associated with the encoded data, the second symbology being configured to be read by the imaging symbology reader when the imaging symbology reader is positioned such that the central FOV axis is substantially angled at 5-30 degrees relative to a surface displaying the second symbology and has a first azimuth value; determining a third symbology associated with the encoded data, the third symbology being configured to be read by the imaging symbology reader when the imaging symbology reader is positioned such that the central FOV axis is substantially angled at 5-30 degrees relative to a surface displaying the third symbology and has a second azimuth value that is different from the first azimuth value; and providing each of the first symbology, the second symbology, and the third symbology on a product packaging.

In still another embodiment, the present invention is a product packaging comprising: a first face; a first symbology provided on the first face; a second symbology provided on the first face; and a third symbology provided on the first face, wherein the second symbology is the first symbology distorted in accordance with a first distortion function, the first distortion function distorting at least one of an aspect ratio and a skew pursuant to a first parameter; and wherein the third symbology is the first symbology distorted in accordance with a second distortion function, the second distortion function distorting at least one of the aspect ratio and the skew pursuant to a second parameter, the second parameter being different from the first parameter.

In a variation of this embodiment, each of the first symbology, the second symbology, and the third symbology is configured to be read by an imaging symbology reader having a two-dimensional field of view (FOV) with a central FOV axis, the first symbology is configured to be read by the imaging symbology reader when the central FOV axis is substantially orthogonal to the first face, and each of the second symbology and the third symbology is configured to be read by the imaging symbology reader when the central FOV axis is substantially angled at 5-30 degrees relative to the first face.

In still another embodiment, the present invention is a product display and data acquisition system for use in a venue. The system includes: a plurality of imaging symbology readers each having a two-dimensional field of view (FOV) with a central FOV axis, the plurality of imaging symbology readers being disposed above a merchandising area within the venue; a plurality of shelves positioned within the merchandising area and configured to display products for picking by consumers; and a product, encased in product packaging, positioned on one of the plurality of shelves, wherein the product packaging includes: a first symbology provided on a face of the product packaging and associated with an encoded data, the first symbology being configured to be read by one of the plurality of imaging symbology readers when the central FOV axis of the one of the plurality of imaging symbology readers is substantially orthogonal to the face of the product packaging; a second symbology provided on the face of the product packaging and associated with the encoded data, the second symbology being configured to be read by the one of the plurality of imaging symbology readers when the central FOV axis of the one of the plurality of imaging symbology readers is substantially angled at 5-30 degrees relative to the face of the product packaging and the product packaging is positioned on the one of the plurality of shelves in a first configuration; and a third symbology provided on the face of the product packaging and associated with the encoded data, the third symbology being configured to be read by the one of the plurality of imaging symbology readers when the central FOV axis of the one of the plurality of imaging symbology readers is substantially angled at 5-30 degrees relative to the face of the product packaging and the product packaging is positioned on the one of the plurality of shelves in a second configuration that is different from the first configuration.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
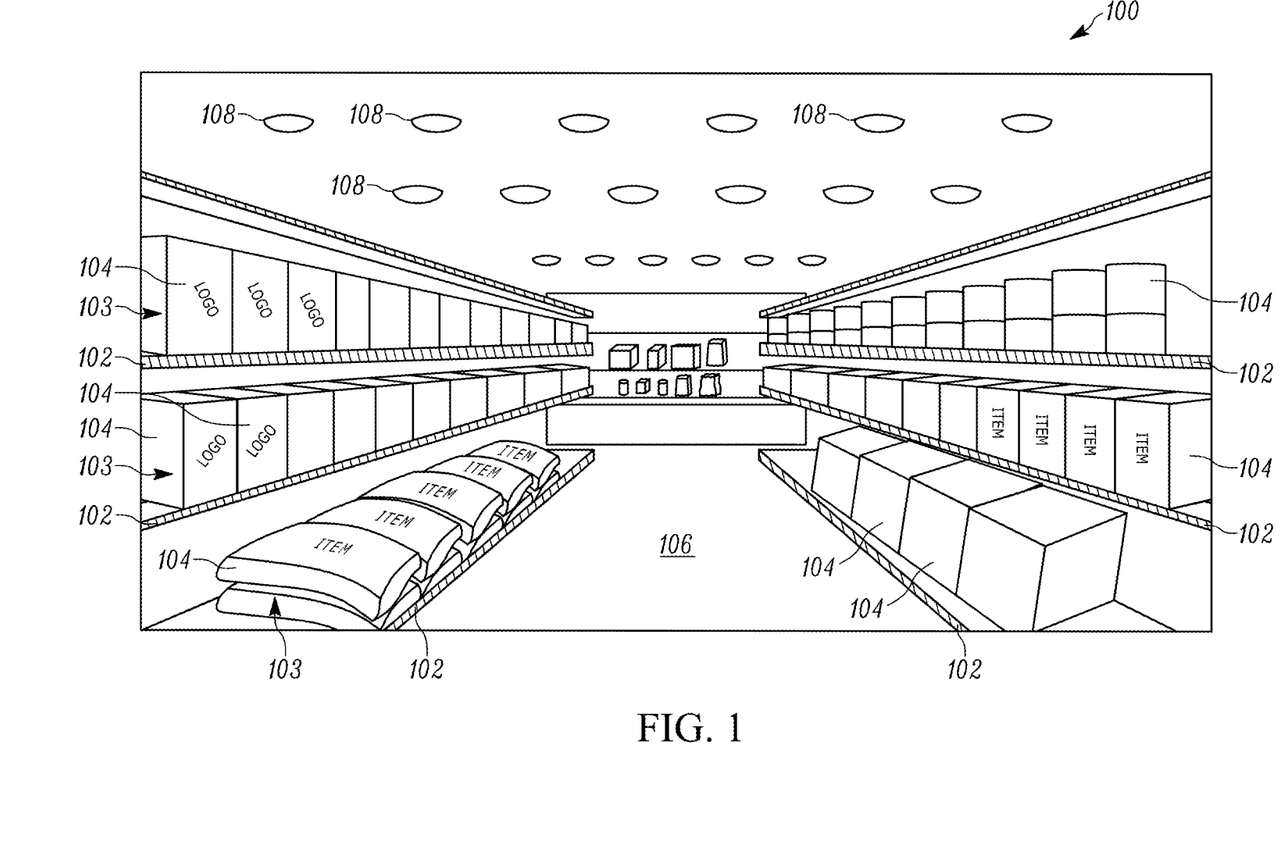
FIG. 1 illustrates a perspective view of an exemplary merchandising area.

Referring now to FIG. 1, shown therein an exemplary merchandising area 100 that, in the currently described embodiment, is illustrated as a grocery store aisle. While the concepts associated with the present disclose are described with reference to the venue being a grocery store and the merchandising area being a store aisle, it should be understood that the disclosed concepts are applicable in other settings (e.g., storage warehouse, other retail venues, transportation and logistics venues, etc.). The merchandising area 100 includes a plurality of shelves 102 arranged to support and display a variety of products 103 packaged in respective product packaging 104. It is envisioned that consumers can traverse the open area 106 (also referred to as the "aisle") of the merchandising area 100 and pick the products 103 that they desire for purchase.

It has been recognized that in some situations extensive tracking of products can be essential to ensuring proper operation of the venue. For instance, as an example, it may be desirable to maintain knowledge of which product is picked at what time/where/by whom to monitor those products for proper checkout at the registers and reduce occurrences of shrink. As another example, in venues employing frictionless shopping, the product checkout process may be implemented at or around the time of the product being picked off the shelf. Given the timing of this process and the potential for lack of cashiers, proper tracking and recognition of products becomes of great importance.

To address this need, at least some embodiments of the present disclosure provide a strategically implemented symbology scheme that can allow a data capture system employing overhead symbology readers to capture and read (i.e., decode) the symbology provided on products. In the embodiment of FIG. 1, such approach can be implemented by the use of symbology image readers 108 disposed overhead, above the merchandising area 100. In some embodiments, the symbology image readers 108 are video cameras having a two-dimensional field-of-view (FOV) with a central FOV imaging axis. Such video cameras may be configured to capture images of targets in the merchandising area 100, such as a person moving through aisle 106 or products 103 encased in product packaging 104 sitting on shelves 102. In some embodiments, the cameras may be a high-bandwidth, video cameras, such as a moving picture expert group (MPEG) compression cameras. In other embodiments, the cameras may include wide-angle capabilities such that camera would be able to capture images over a large area to produce a video stream of the images. In still other embodiments, the cameras may include narrow-angle capabilities, focusing on a predefined portion of one or more shelves 102 and the products 103 positioned thereon. The image data captured by the symbology image readers 108 can be transmitted to a centralized server (not shown) via a wired and/or wireless network linking each of the symbology image readers 108 to the server.

It has been recognized that in a setting like the one described in FIG. 1, symbology image readers 108 can be used to track and/or identify products 103, via their product packaging 104, as they are positioned on the shelves 102 and/or as they are picked by the consumers. While in some cases this can be achieved via extensive and complex image analysis, detecting the overall features/appearance and position of each product packaging, such approach may be costly and computationally burdensome. Accordingly, a more preferable approach would be to monitor for, track, and read machine readable symbology provided on the product packaging 104, thereby allowing for determination of a position of a specific product by virtue of the position of the symbology which encodes product-identifying data.

Figure 2:
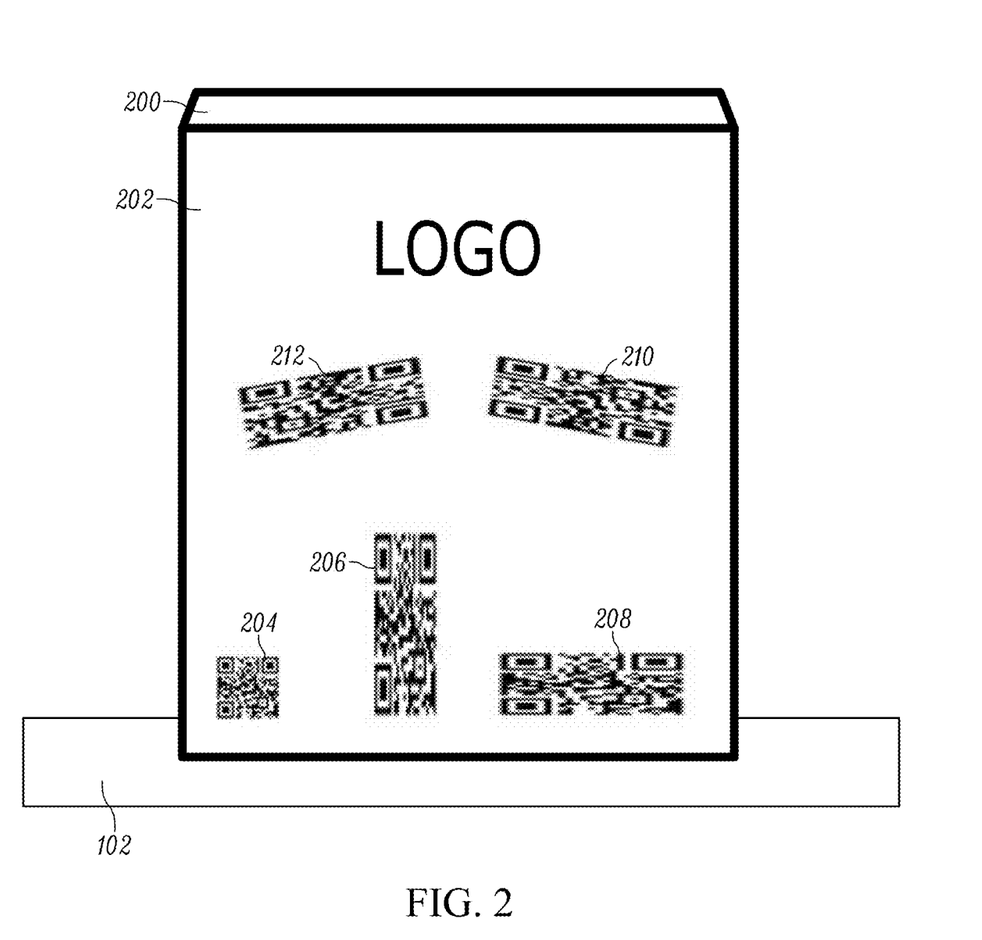
FIG. 2 illustrates an exemplary product packaging having a plurality of exemplary symbologies provided thereon.

FIG. 2 illustrates an exemplary product packaging 200 that can be advantageously used in the merchandising area 100 of FIG. 1 and be stacked on shelves 102. Product packaging 200 includes a front face 202 that is generally adapted to face the open area of the aisle 106 and be visible to consumers passing therethrough. Consequently, this is also the face that is likely to be within the FOV of at least one of the symbology image readers 108 installed overhead, as shown in FIG. 1.

Given the overhead position of the symbology image readers 108 and the forward-facing orientation of the front face 202 of the product packaging 200, the respective image readers 108 may be unable to adequately capture image data associated with conventional symbology positioned on the front face 202. This is because conventional symbology like, for example, a two-dimensional barcode like a Quick Response (QR) code, is designed to be optimally read by an imaging reader having its central FOV axis be substantially normal to the surface on which the two-dimensional barcode is provided. As a result, symbology image reader 108 positioned relatively close to the product packaging 200 may have its central FOV axis be positioned at a relatively large angle off the normal to the front face 202, whereby the large angle can prevent proper operation of the symbology reader.

Figure 3:
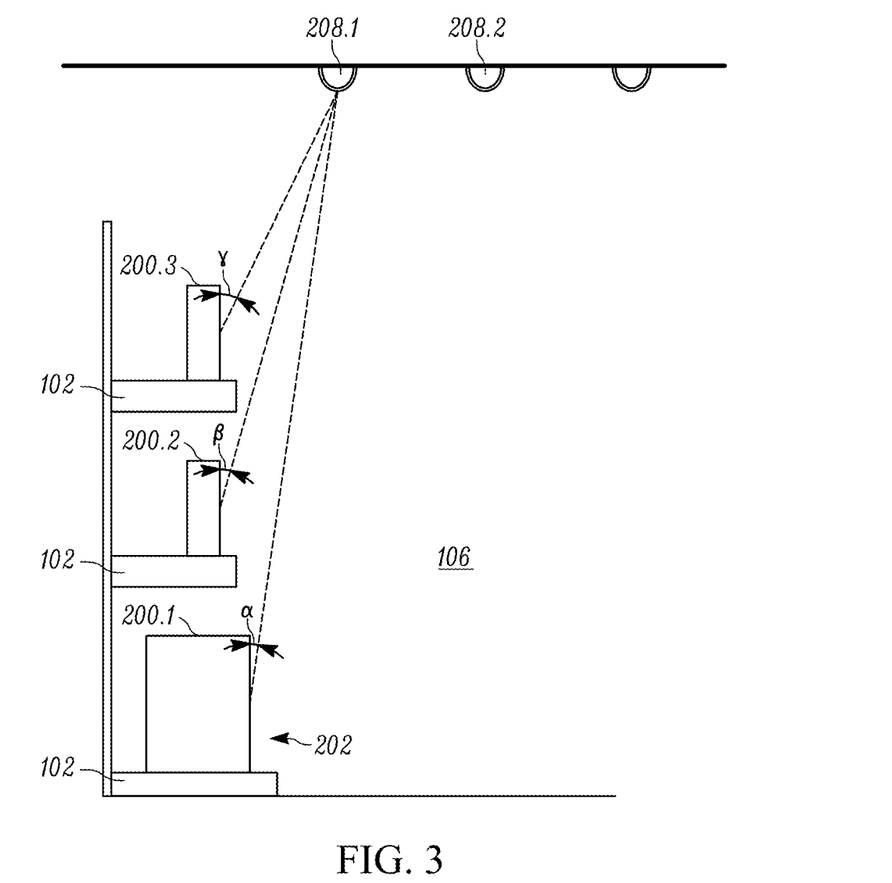
FIG. 3, illustrates an exemplary partial side cross-section view of a merchandising area having products encased in product packaging and stocked on shelves.

An example of such configuration is illustrated in FIG. 3, which shows a partial side cross-section view of the merchandising area 100, having products encased in product packaging 200 stocked on shelves 102. Preferably, the product packaging is arranged such that the front face 202 of the various products packages 200 face the aisle 106. When considering the symbology image reader 208.1, is can be seen that the line of sight between the reader 208.1 and the lower-most product package 200.1 forms about a 10 degree angle α relative to its front face 202, the line of sight between the reader 208.1 and the middle product package 200.2 forms about a 15 degree angle β relative to its front face 202, and the line of sight between the reader 208.1 and the top-most product package 200.3 forms about a 25 degree angle γ relative to its front face 202. While in some embodiments, the illustrated lines of sight can coincide with a central FOV axis of the reader 208.1, that does not always have to be the case, and in some embodiments each line of sight may simply be within the FOV of the reader 208.1. In this arrangement, conventional placement of a symbology on a front face 202 of the product packaging 200 may cause the image reader 208.1 to not be able to capture sufficient detail to properly decode the symbology. This can occur for several reasons, including the potential lack of the reader 208.1 to properly resolve the necessary detail in the, what appears to be, rotated symbology, and apparent physical distortion of the symbology itself. While the positioning of the reader 208.2 may be more advantageous from the angular position point of view (i.e., its line of sight angle will be closer to normal relative to the front faces 202), its further distance from the shelves 102 may detract from its ability to resolve sufficient detail. Implementing the approach exemplarily described in FIG. 2 may address this issue, allowing readers, like reader 208.1, with large off-normal angles to still be able to capture symbologies printed on the front faces 202 of product packages 200.

Figure 4:
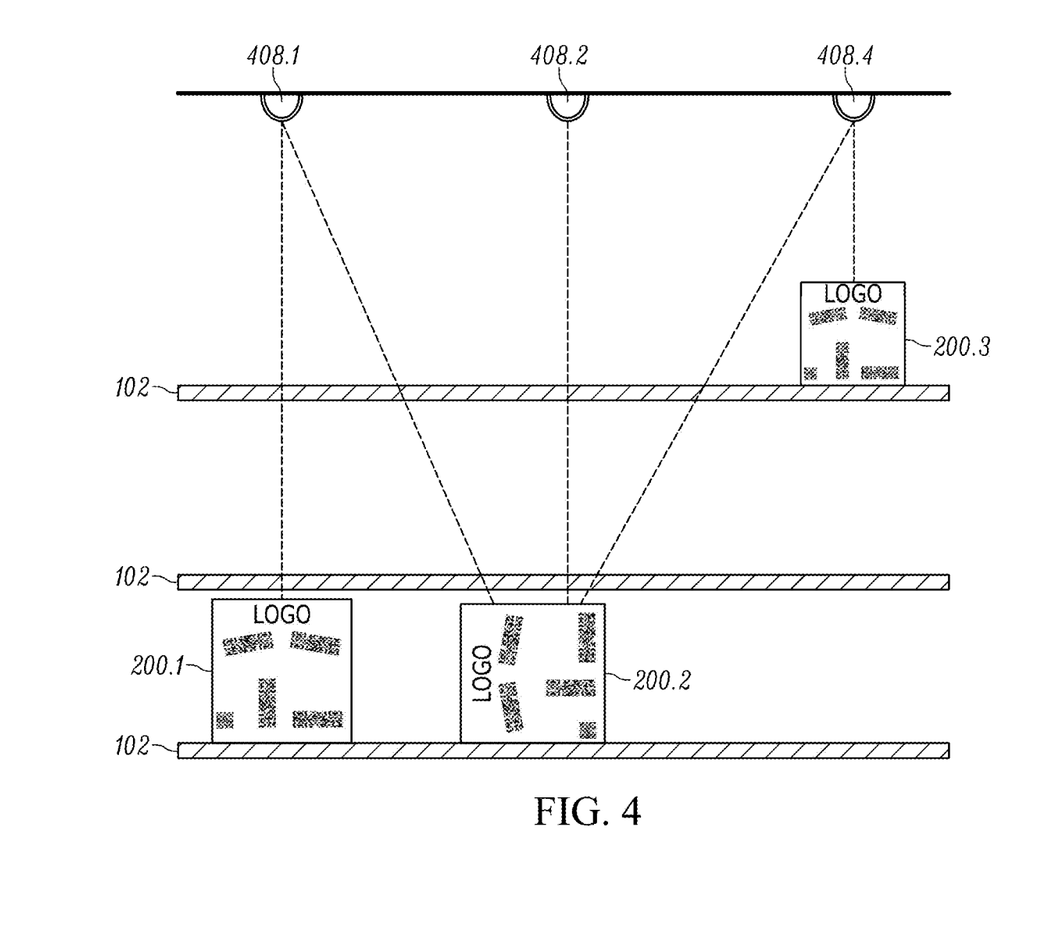
FIG. 4, illustrates an exemplary front-facing view of a plurality of product packages positioned on a plurality of shelves along with a plurality of symbology image readers disposed overhead.

Referring to FIG. 4A, shown therein is a front-facing view of a plurality of product packages 200.1-200.3 (as shown by example in FIG. 2) positioned on a plurality of shelves 102 along with a plurality of symbology image readers 408.1-408.3 disposed overhead. It should be assumed that readers 408.1-408.3 are positioned in a manner that it similar to the reader 208.1 of FIG. 3, and relatively close to the shelves 102 such that their line of sight to each of the product packages 200.1-200.3 forms a relatively small angle relative to the front face of each respective product package (or as may be said otherwise, forms a relatively large angle relative to an axis normal to the front face of each respective product package). Each of the product packages 200.1-200.3 includes an exemplary arrangement of symbologies in accordance with an embodiment of the present disclosure. As shown in greater detail in FIG. 2, each product package 200.1-200.3 includes a first symbology 204, a second symbology 206, a third symbology 208, a fourth symbology 210, and a fifth symbology 212. Each symbology 204-212 is associated with the same encoded data, typically provided to identify the product encased within the packaging. In the currently described embodiment, the first symbology 204 is provided in its non-modified form (e.g., a form that is defined by a relevant standard like the QR code standard). The second symbology 206 is a visually distorted version of the first symbology 204, where the aspect ratio of the first symbology 204 has been altered such that the height of the first symbology 204 has been increased by a factor of two while the width of the first symbology 204 has remained the same. The third symbology 208 is a visually distorted version of the first symbology 204, where the aspect ratio of the first symbology 204 has been altered such that the width of the first symbology 204 has been increased by a factor of two while the height of the first symbology 204 has remained the same. The fourth symbology 210 is a visually distorted version of the first symbology 204, where the aspect ratio of the first symbology 204 has been altered such that the height of the first symbology 204 has been increased by a factor of two while the width of the first symbology 204 has remained the same, and the resulting symbology has been rotated approximately 80 degrees counter clockwise. And the fifth symbology 212 is a visually distorted version of the first symbology 204, where the aspect ratio of the first symbology 204 has been altered such that the height of the first symbology 204 has been increased by a factor of two while the width of the first symbology 204 has remained the same, and the resulting symbology has been rotated approximately 80 degrees clockwise.

Figure 5A:
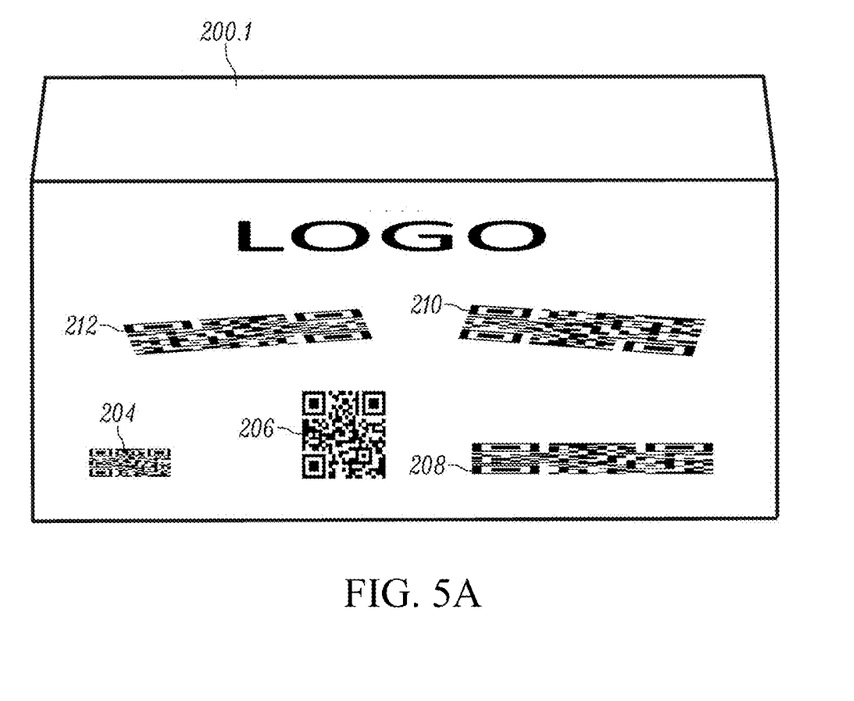
FIG. 5A-5E illustrate images of the product packaging, as they appear within the respective readers' FOV.

When positioned on the shelves 102 of FIG. 4, the aforementioned symbology arrangement can compensate for the visual distortion of the caused by the particular arrangement of the readers 408.1-408.3 and the product packages 200.1-200.3. For example, product package 200.1 can appear within the reader's 408.1 FOV as shown in FIG. 5A, where the line of sight from the reader 408.3 to the product package 200.1 forms approximately a 20-degree angle. In this case, the intentionally distorted symbology 206 will appear to the reader 408.1 similar to the first, non-distorted symbology such that an image thereof should be sufficient to successfully process a decode operation. It can be appreciated that while symbology 206 should be successfully decoded, the appearance of the first symbology 204 is substantially distorted whereby a successful decode thereof is not likely.

Figure 5B:
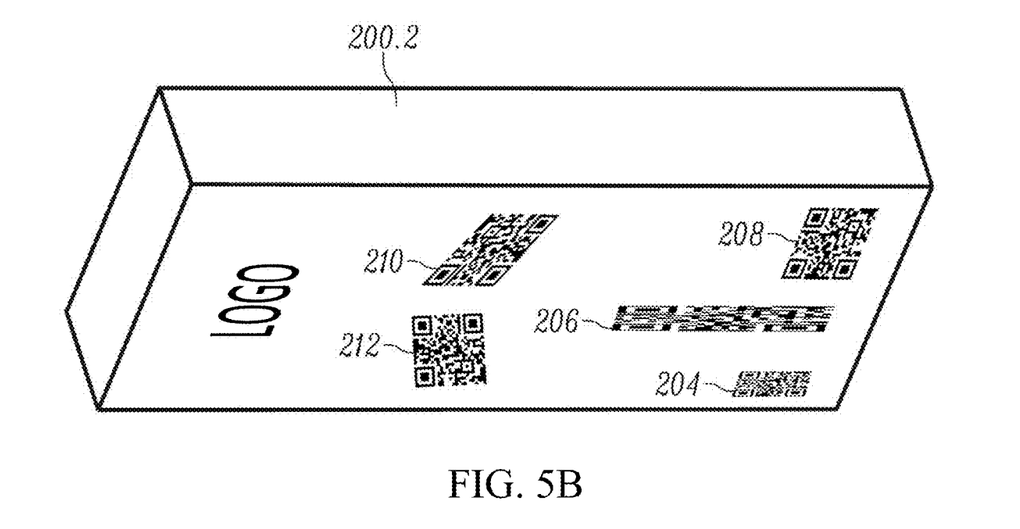

Product packaging 200.2 may also appear within the FOV of the reader 408.1, as illustrated in FIG. 5B. As can be gleamed from the figures (particularly FIG. 4), packaging 200.2 has been positioned on its side (potentially due to misplacement) thereby being rotated about 90 degrees counter clockwise. Due to this position and the lateral offset of the reader 408.1 from the packaging 200.2, the resulting image of the product packaging 200.2 is distorted relative to its original width and further laterally skewed as shown. This distortion is compensated for by the intentional distortion imparted into the fifth symbology 212 which, when captured by the reader 408.1, appears similar to that of first, non-distorted symbology. Consequently, upon capturing an image of the fifth symbology 212, said image can be processed to successfully decode the data encoded therein.

Figure 5C:
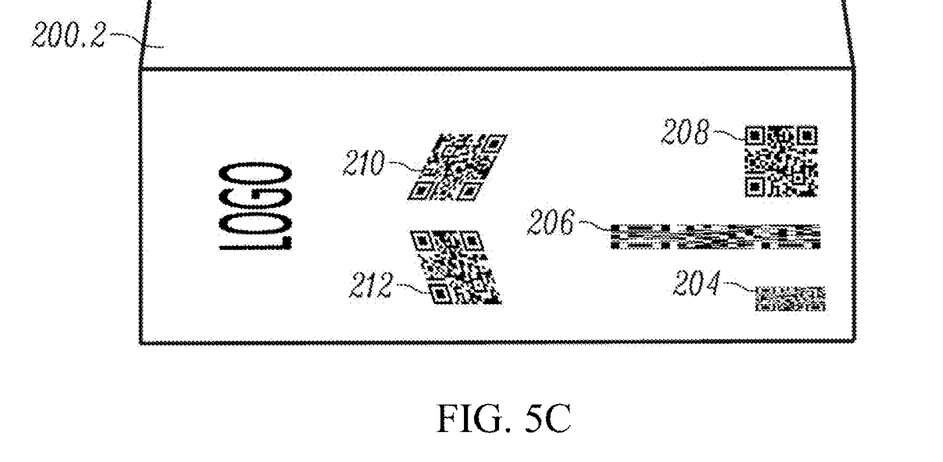

Examining the symbology reader 408.2, a similar approach to reading product symbology can be seen. FIG. 5C illustrates an image of the product packaging 200.2, as it would appear within the reader's 408.2 FOV. It is envisioned that the line of sight from the reader 408.2 forms approximately a 20-degree angle with the face of the product package 200.2. The resulting visual distortion is compensated for by the intentional distortion imported into the third symbology 208 which, when captured by the reader 408.2, appears similar to that of first, non-distorted symbology. Consequently, upon capturing an image of the third symbology 208, said image can be processed to successfully decode the data encoded therein.

Figure 5D:
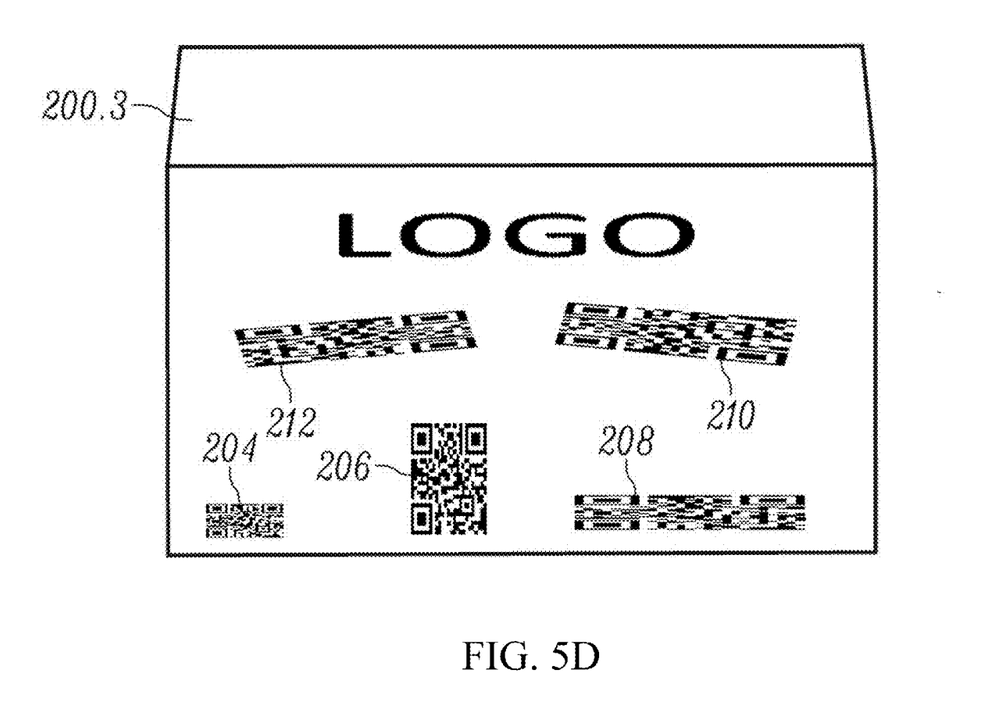
Figure 5E:
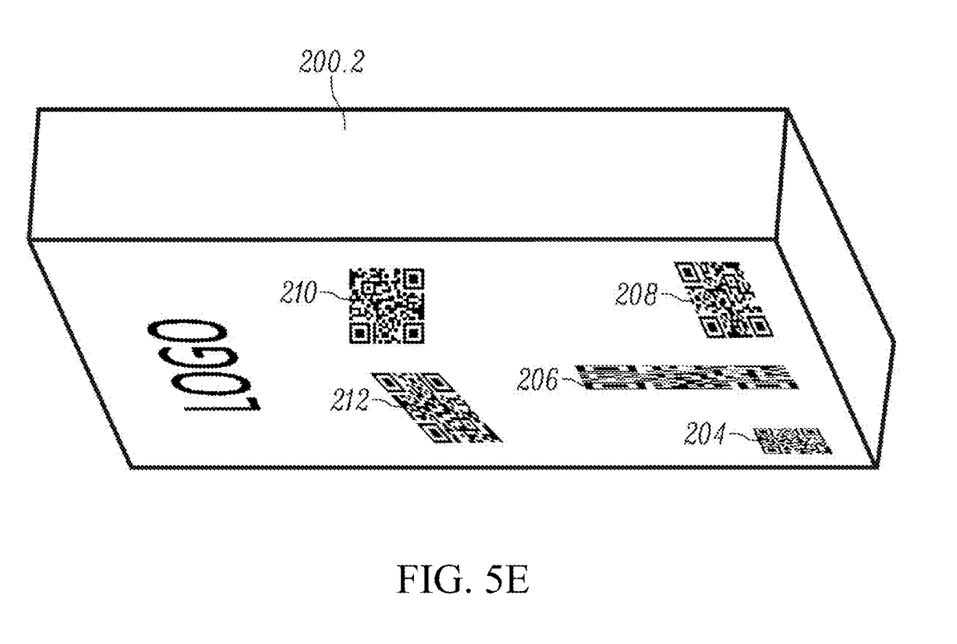

As with readers 408.1 and 408.2, reader 408.3 can also advantageously use the intestinally distorted symbologies to capture and process at least one symbology out of a plurality being captured on a face of one product packaging. FIG. 5D illustrates an image of the product packaging 200.3, as it would appear within the reader's 408.3 FOV. It is envisioned that the line of sight from the reader 408.3 forms approximately a 30-degree angle with the face of the product package 200.3. The resulting visual distortion is compensated for by the intentional distortion imported into the second symbology 206 which, when captured by the reader 408.3, appears similar to that of first, non-distorted symbology. While this resulting image maintains some level of aspect-ration distortion, this distortion does not exceed a threshold for proper symbology recognition. Consequently, upon capturing an image of the second symbology 206, said image can be processed to successfully decode the data encoded therein. Product package 200.2 may also appear within the FOV of the symbology reader 408.3. FIG. 5E illustrates an image of the product packaging 200.2, as it would appear within the reader's 408.3 FOV. In this case, the rotation of the product package and its positioning relative to the reader 408.3 would cause the line of sight from the reader 408.3 to form approximately a 20-degree angle with the face of the product package 200.2 and would further cause the resulting image of the product packaging to be laterally skewed as shown. The resulting visual distortion is compensated for by the intentional distortion imported into the fourth symbology 210 which, when captured by the reader 408.3, appears similar to that of first, non-distorted symbology. Consequently, upon capturing an image of the fourth symbology 210, said image can be processed to successfully decode the data encoded therein.

As will be appreciated, the specific positioning, arrangement, distortion, and/or symbology should not be viewed as limiting. That is, the specific distortion, positioning, and/or arrangement will likely depend on the particular symbology implemented on the product packaging, the layout of the merchandising area, and/or the arrangement/layout of the symbology readers. Additionally, other distortion functions may be applied as needed to compensate for, for example, the shape of the surface that the symbology is printed on. Consequently, symbologies may be distorted by, for example, changing the aspect ratio, skew, taper, rotation, etc. As illustrated above, this approach may help symbology readers accurately read and decode symbologies which would otherwise not be decodable. Moreover, at least some embodiments of the disclosed approach can continue to properly decode symbologies on potentially misplaced product packages.

Additionally, it should be appreciated that various types of symbologies may be used in connection with the disclosed approach. These symbologies may, but do not have to, be readily visible to a human eye. For example, machine readable symbologies may be embedded in the product packaging such that their presence may be read my machine vision while at the same time being substantially or fully invisible to a human eye.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method of providing encoded data for product identification, the method comprising:
   providing a product packaging having a first face;
   providing a first symbology on the first face;
   providing a second symbology on the first face; and
   providing a third symbology on the first face,
   wherein the second symbology is the first symbology distorted in accordance with a first distortion function, the first distortion function distorting at least one of an aspect ratio and a skew pursuant to a first parameter; and
   wherein the third symbology is the first symbology distorted in accordance with a second distortion function, the second distortion function distorting at least one of the aspect ratio and the skew pursuant to a second parameter, the second parameter being different from the first parameter.

2. The method of claim 1, wherein each of the first symbology, the second symbology, and the third symbology is a two-dimensional symbology.

3. The method of claim 2, wherein:
   each of the first symbology, the second symbology, and the third symbology is configured to be read by an imaging symbology reader having a two-dimensional field of view (FOV) with a central FOV axis,
   the first symbology is configured to be read by the imaging symbology reader when the central FOV axis is substantially orthogonal to the first face, and
   each of the second symbology and the third symbology is configured to be read by the imaging symbology reader when the central FOV axis is substantially angled at 5-30 degrees relative to the first face.

4. The method of claim 2, wherein the second symbology is further configured to be read by the imaging symbology reader when the central FOV axis has a first azimuth value, and wherein the third symbology is further configured to be read by the imaging symbology reader when the central FOV axis has a second azimuth value that is different from the first azimuth value.

5. The method of claim 4, wherein the second azimuth value is offset from the first azimuth value between 40 degrees and 140 degrees.

6. A method of providing encoded data for product identification, the method comprising:
   determining a first symbology associated with the encoded data, the first symbology being configured to be read by an imaging symbology reader having a two-dimensional field of view (FOV) with a central FOV axis when the imaging symbology reader is positioned such that the central FOV axis is substantially orthogonal to a surface displaying the first symbology;
   determining a second symbology associated with the encoded data, the second symbology being configured to be read by the imaging symbology reader when the imaging symbology reader is positioned such that the central FOV axis is substantially angled at 5-30 degrees relative to a surface displaying the second symbology and has a first azimuth value;
   determining a third symbology associated with the encoded data, the third symbology being configured to be read by the imaging symbology reader when the imaging symbology reader is positioned such that the central FOV axis is substantially angled at 5-30 degrees relative to a surface displaying the third symbology and has a second azimuth value that is different from the first azimuth value; and
   providing each of the first symbology, the second symbology, and the third symbology on a product packaging.

7. The method of claim 6, wherein the second azimuth value is offset from the first azimuth value between 40 degrees and 140 degrees.

8. The method of claim 6, wherein the operation of determining the second symbology includes distorting the first symbology pursuant to a first distortion function, and wherein the operation of determining the third symbology includes distorting the first symbology pursuant to a second distortion function.

9. The method of claim 8, wherein the first distortion function distorts at least one of an aspect ratio and a skew pursuant to a first parameter, wherein the second distortion function distorts at least one of the aspect ratio and the skew pursuant to a second parameter, and wherein the second parameter is different from the first parameter.

10. The method of claim 6, wherein the operation of providing includes providing each of the first symbology, the second symbology, and the third symbology on a first face of the product packaging.

11. The method of claim 10, wherein each of the second symbology and the third symbology is further configured to compensate for a non-orthogonal perspective of the central FOV axis of the imaging symbology reader.

12. The method of claim 6, wherein each of the first symbology, the second symbology, and the third symbology is a two-dimensional symbology.

13. A product packaging comprising:
   a first face;
   a first symbology provided on the first face;
   a second symbology provided on the first face; and
   a third symbology provided on the first face,
   wherein the second symbology is the first symbology distorted in accordance with a first distortion function, the first distortion function distorting at least one of an aspect ratio and a skew pursuant to a first parameter; and wherein the third symbology is the first symbology distorted in accordance with a second distortion function, the second distortion function distorting at least one of the aspect ratio and the skew pursuant to a second parameter, the second parameter being different from the first parameter.

14. The product packaging of claim 13, wherein each of the first symbology, the second symbology, and the third symbology is a two-dimensional symbology.

15. The product packaging of claim 14, wherein:
each of the first symbology, the second symbology, and the third symbology is configured to be read by an imaging symbology reader having a two-dimensional field of view (FOV) with a central FOV axis,
the first symbology is configured to be read by the imaging symbology reader when the central FOV axis is substantially orthogonal to the first face, and
each of the second symbology and the third symbology is configured to be read by the imaging symbology reader when the central FOV axis is substantially angled at 5-30 degrees relative to the first face.

16. The product packaging of claim 14, wherein the second symbology is further configured to be read by the imaging symbology reader when the central FOV axis has a first azimuth value, and wherein the third symbology is further configured to be read by the imaging symbology reader when the central FOV axis has a second azimuth value that is different from the first azimuth value.

17. The product packaging of claim 16, wherein the second azimuth value is offset from the first azimuth value between 40 degrees and 140 degrees.

18. A product display and data acquisition system for use in a venue, comprising:
a plurality of imaging symbology readers each having a two-dimensional field of view (FOV) with a central FOV axis, the plurality of imaging symbology readers being disposed above a merchandising area within the venue;
a plurality of shelves positioned within the merchandising area and configured to display products for picking by consumers; and
a product, encased in product packaging, positioned on one of the plurality of shelves, wherein the product packaging includes:
a first symbology provided on a face of the product packaging and associated with an encoded data, the first symbology being configured to be read by one of the plurality of imaging symbology readers when the central FOV axis of the one of the plurality of imaging symbology readers is substantially orthogonal to the face of the product packaging;
a second symbology provided on the face of the product packaging and associated with the encoded data, the second symbology being configured to be read by the one of the plurality of imaging symbology readers when the central FOV axis of the one of the plurality of imaging symbology readers is substantially angled at 5-30 degrees relative to the face of the product packaging and the product packaging is positioned on the one of the plurality of shelves in a first configuration; and
a third symbology provided on the face of the product packaging and associated with the encoded data, the third symbology being configured to be read by the one of the plurality of imaging symbology readers when the central FOV axis of the one of the plurality of imaging symbology readers is substantially angled at 5-30 degrees relative to the face of the product packaging and the product packaging is positioned on the one of the plurality of shelves in a second configuration that is different from the first configuration.

19. The product display and data acquisition system of claim 18, wherein, in the second configuration, the product packaging is rotated approximately 90 degrees relative to the first configuration.

20. The product display and data acquisition system of claim 18, wherein the second symbology is the first symbology distorted pursuant to a first distortion function, and wherein the third symbology is the first symbology distorted pursuant to a second distortion function.

21. The product display and data acquisition system of claim 20, wherein the first distortion function distorts at least one of an aspect ratio and a skew pursuant to a first parameter, wherein the second distortion function distorts at least one of the aspect ratio and the skew pursuant to a second parameter, and wherein the second parameter is different from the first parameter.

\* \* \* \* \*